N. E. DAILEY.
BROODER.
APPLICATION FILED MAY 18, 1916.
1,195,914.
Patented Aug. 22, 1916.
2 SHEETS—SHEET 1.
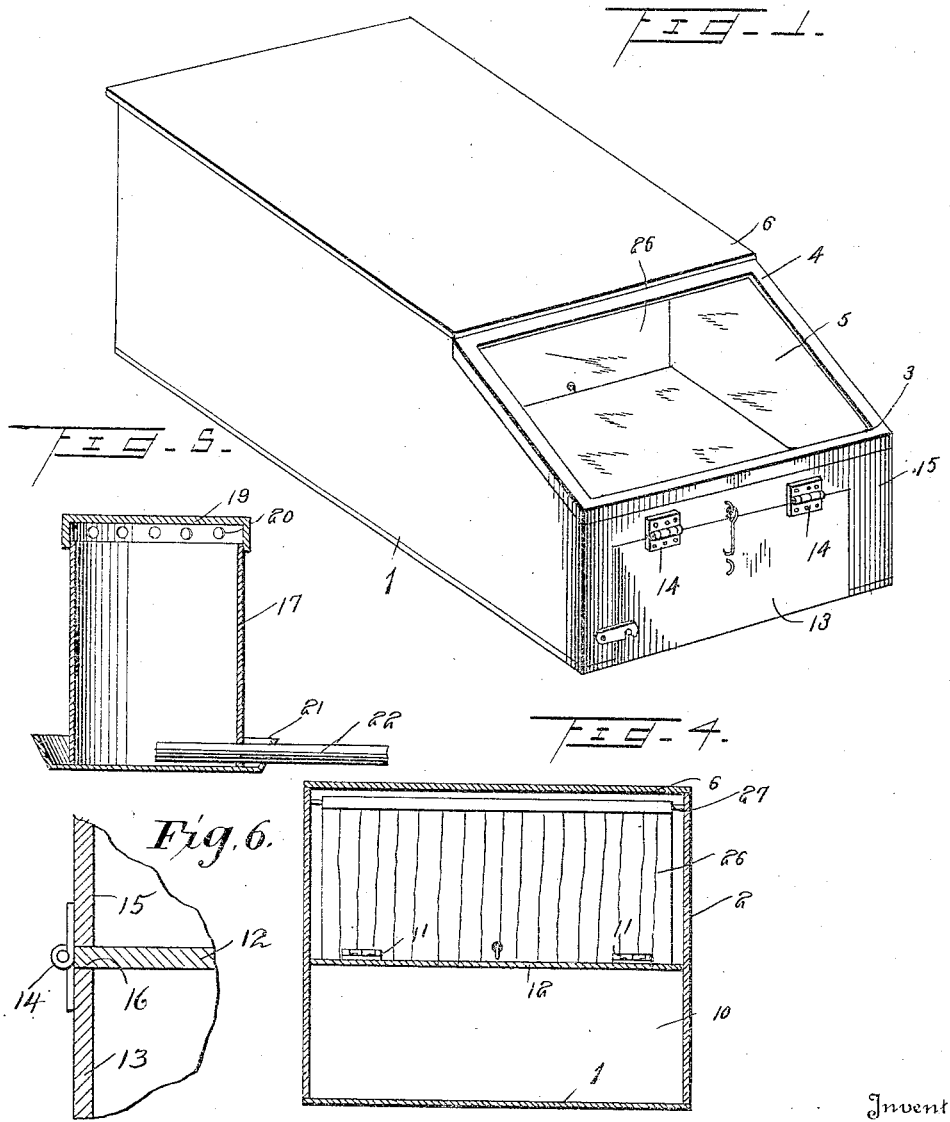

N. E. DAILEY.
BROODER.
APPLICATION FILED MAY 18, 1916.
1,195,914.
Patented Aug. 22, 1916.
2 SHEETS—SHEET 2.
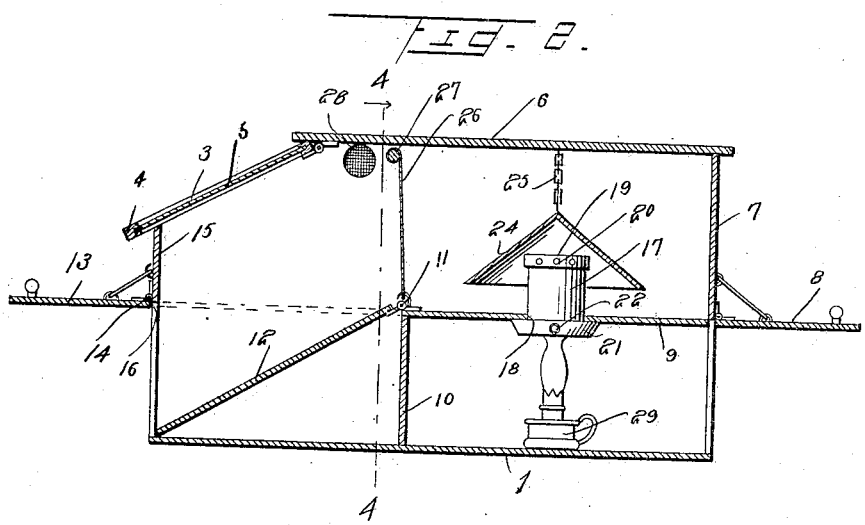
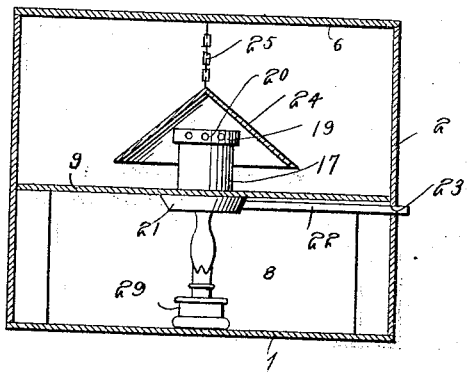
Witness
R. Stanton
Inventor
N. E. Dailey.
By
Attorney

UNITED STATES PATENT OFFICE.

NEWELL E. DAILEY, OF HORNICK, IOWA.

BROODER.

1,195,914.  Specification of Letters Patent.  Patented Aug. 22, 1916.

Application filed May 18, 1916. Serial No. 98,385.

*To all whom it may concern:*

Be it known that I, NEWELL E. DAILEY, a citizen of the United States, residing at Hornick, in the county of Woodbury and State of Iowa, have invented certain new and useful Improvements in Brooders; and I do hereby declare the following to be a full, clear, and exact description of the invention, such as will enable others skilled in the art to which it appertains to make and use the same.

This invention relates to new and useful improvements in brooders and the principal object of the invention resides in the provision of a novel heating means for a brooder which will effectively warm the hover compartment.

Another object of the invention is to provide a brooder having a sunning compartment just off from the hover compartment the floor of which is hinged so that the same can form a run when it is desired to allow the chicks occupying the brooder out of the same.

A still further object of the invention is to provide a novel means for supporting the floor of the sunning compartment in its raised position when the brooder is closed.

With these and other objects in view, the invention consists in the novel combination and arrangement of parts which will be fully set forth in the following specification and accompanying drawings, in which:—

Figure 1 is a perspective view of a brooder constructed in accordance with this invention. Fig. 2 is a longitudinal sectional view through the brooder. Fig. 3 is a transverse sectional view through the brooder. Fig. 4 is a transverse sectional view through the brooder taken on line 4—4 of Fig. 2, and Fig. 5 is an enlarged detail view of the heating drum. Fig. 6 is an enlarged fragmentary sectional view showing the method of supporting the floor of the sunning compartment on the door of the brooder when the device is in a closed position.

Referring to the drawings the numeral 1 designates the bottom of the brooder having secured thereto the side walls 2. The forward ends of the upper edges of these side walls are inclined as at 3 to support the hinged cover 4 carrying the glass panel or pane 5. The upper edges of the side walls are connected by the top 6 forming the roof of the device and the rear end of the bottom has attached thereto the end walls 7 provided with the hinged door 8 which allows access to the lamp compartment. The lamp compartment above referred to is separated from the brooder or hover compartment by the horizontal wall or floor 9 and a vertical partition 10 is secured to the forward end of the wall or floor 9 and to the bottom 1 intermediate its ends thus forming the lamp compartment in the lower rear corner of the device. It will thus be seen that the brooder compartment is formed directly over the lamp compartment and hinged as at 11 to the forward edge of the floor 9 is the floor 12 which extends beneath the cover 4 to form the floor for the sunning compartment. A suitable door 13 is hinged as at 14 to the front wall 15 of the brooder and the upper edge designated by the numeral 16 of the door 13 is adapted to form a rest for the floor 12 when the brooder is closed and to allow the floor 12 to move into the position shown in the full lines of Fig. 2 when the brooder is open.

The heating element of the device consists of the drum 17 which is secured in an opening 18 formed centrally of the floor 9 and the upper end of this drum is provided with a cover 19 having a plurality of openings 20 through which the warm air passes into the brooder compartment. A suitable plate 21 which is of greater diameter than the diameter of the drum 17 is secured to the under side of the floor 9 to form the bottom wall of the drum and this plate is formed with a lateral opening through which the pipe 22 extends. This pipe extends through one of the side walls 2 as at 23 to form a fresh air duct by which fresh air is admitted to the heating drum. A suitable conical baffle or hood 24 is suspended on a suitable chain 25 directly above the upper end of the drum and is arranged so that its lower edge is exposed in a plane substantially one-half of the height of the drum. Thus it will be seen that the drum will project up into the hood as clearly will shown in the drawings. In this way it will be apparent that the warm air passing through the openings 20 will be directed downwardly toward the chicks beneath the hood.

In order to separate the hover and sunning compartment from each other a suitable curtain 26 is provided and consists of a plurality of strips of a suitable cloth or other flexible material suspended on the rod 27 which is positioned directly over the forward edge of the floor 9. The foul air from the brooder passes out through a suitable screened opening 28 formed in one of the side walls 2 just forwardly of the bar 27 and it will thus be seen that a fresh supply of warm air is kept at all times within the brooder compartment.

In order to heat the device a suitable lamp 29 is positioned within the lamp compartment and directly beneath the heating drum as illustrated in Figs. 2 and 3 and it will be apparent that the hot gases directed against the under side of the pan 21 will heat the same and thus warm the air passing through the drum.

While in the foregoing there has been shown and described the preferred embodiment of this invention, it is to be understood that such changes may be made in the combination and arrangement of parts as will fall within the spirit and scope of the appended claims.

What is claimed is:—

1. A brooder including a brooding chamber, a sunning compartment communicating with the brooding compartment, a hinged floor for the sunning compartment, said floor being adapted to be let down to provide a run and a door on the front end of the brooder, said door being adapted to hold the floor upwardly when in closed position.

2. A brooder including a bottom, side walls secured to the bottom, a top secured to the side walls, a back secured to the side walls top and bottom, a floor intermediate the top and bottom arranged at the rear end of the brooder, a door at the forward end of the brooder, said door being hinged to the front end in a plane parallel to the upper face of the floor, a hinged floor at the forward end of the stationary floor, the forward edge of the hinged floor resting on the upper edge of the door when the brooder is closed.

3. A brooder including a brood chamber, a lamp chamber beneath the brood chamber, a heating drum extending into the brood chamber, the lower end of the heating drum being open and disposed within the lamp chamber, a pan supported beneath the lower end of the heating drum, a fresh air pipe extending through one side of the brooder and into the pan, an apertured cap at the upper end of the heating drum to permit the passage of warm air from the drum and a conical hood suspended above the drum and having its lower edge positioned at a point substantially midway of the upper and lower ends of the drum.

In testimony whereof I affix my signature in presence of two witnesses.

NEWELL E. DAILEY.

Witnesses:
L. A. PATTERSON,
J. W. HOWE.